Feb. 23, 1932.   P. C. ASHTON   1,846,243
SEPARABLE TEAT CUP
Filed June 25, 1931
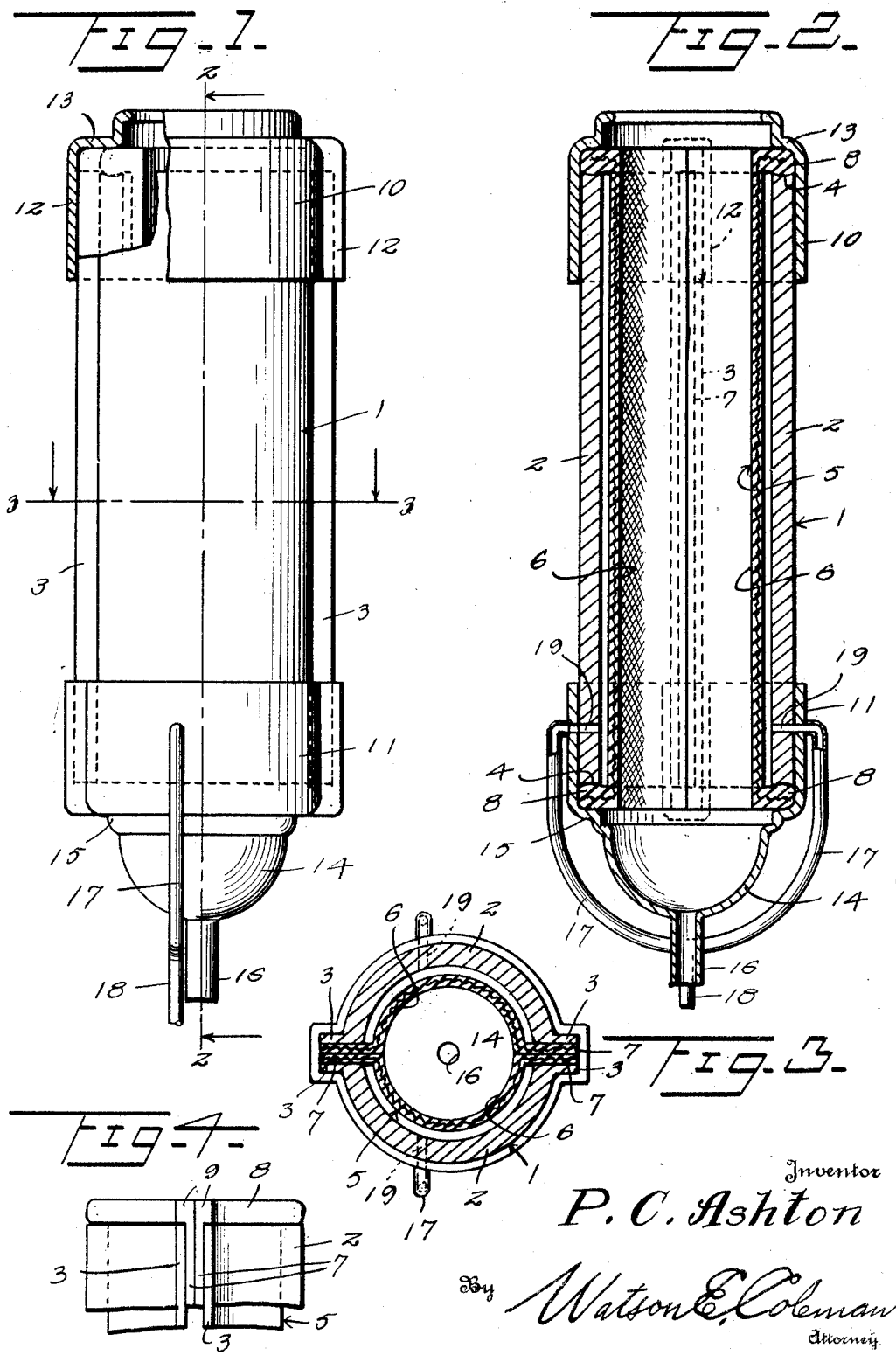
Inventor
P. C. Ashton
By Watson E. Coleman
Attorney Patented Feb. 23, 1932

1,846,243

UNITED STATES PATENT OFFICE

PERCY CLIFFORD ASHTON, OF WATERLOO, IOWA

SEPARABLE TEAT CUP

Application filed June 25, 1931. Serial No. 546,874.

This invention relates to improvements in teat cups for milking machines.

The primary object of the present invention is to provide an improved form of teat cup which may be easily kept in a clean and sanitary condition.

Another object of the invention is to provide a teat cup designed to be readily taken apart so that the interior thereof may be exposed for cleaning.

The invention broadly contemplates the provision of an elongated cylindrical body which is divided longtiudinally. Each of the two portions of the body has a resilient web secured across the inner face thereof and the portions of the body and the webs are secured together to form the cylindrical cup, by removable members which slip onto the ends of the body. One of these members closes the end of the body which it engages and has connected therewith a milk lead-off tube and a pair of air pipes. The air tubes carried by the last mentioned member are placed in communication with the areas between the body sections and the resilient liners therein so that when the teat cup is in operating position air may be readily injected and withdrawn so as to alternately expand and contract the resilent bodies to produce the necessary massaging action upon the teat to produce a flow of milk.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in side elevation of the teat cup embodying the present invention, a portion thereof being broken away to show details of construction.

Figure 2 is a longitudinal sectional view taken on the line 2—2 of Figure 1.

Figure 3 is a view in transverse section taken on the line 3—3 of Figure 1.

Figure 4 is a view in side elevation of the upper end of the cup before applying the end collar thereto.

Referring now more particularly to the drawings, wherein like numerals of reference indicate corresponding parts throughout the several views, the numeral 1 indicates generally the metal body forming the shell of the teat cup embodying the present invention, which body or shell is of cylindrical formation and is longitudinally divided to form the two semi-cylindrical portions 2.

Each of the portions 2 has a lateral flange 3 extending throughout each longitudinal edge thereof and each end edge of each section is slightly depressed or grooved, as indicated at 4.

Within the shell 1 is an expansible cylindrical liner 5 which is of cylindrical formation and is longitudinally divided to form the two semi-cylindrical portions, each of which is indicated by the numeral 6 and each of which has a flange 7 extending throughout each longitudinal edge. At each end of the expansible cylinder 5 each of the portions, is provided with an outwardly projecting surrounding bead 8 and each of these beads merges at each end with an outwardly projecting thickened portion 9 which forms a terminal of each end of each flange 7.

The cylindrical expansible body 5 is of materially less diameter than the casing 1 and when it is in position in the casing the flanges 7 thereof are in abutting relation, as shown in Figure 3, and are interposed between the flanges 3 of the casing sections. When the expansible inner body 5 is in this position the beads 8 about the ends thereof rest upon the ends of the shell 1 and in the recesses or grooves 4, as clearly shown in Figure 2.

The sections or portions 2 of the shell are secured together by the upper and lower end caps 10 and 11 respectively. The upper cap 10 is in the form of a circular body having at diametrically opposite points the longitudinally extending channels 12, which receive the opposed flanges 3 of the shell, as illustrated in Figure 1.

The upper end of this cap 10 is of reduced diameter so that there is formed an inwardly extending shoulder 13 which bears against the beads 8 upon the adjacent end of the expansible inner member and forces the same against the adjacent end of the shell. The upper cap is open at its upper end to permit of the insertion of the teat into the cap.

The lower cap 11 is of the same design as the cap 10, with the exception of the fact that instead of being open throughout its lower end, has the dome-like head 14 thereover which is joined to the inturned flange 15 which forms the restricted portion of the cap and which bears against the beads 8 upon the lower ends of the portions 6 of the expansible body. This head has a tube 16 leading from the central portion thereof through which the milk may be led off from the cup.

The lower cup 11 is further distinguished from the upper cup in that it has connected with the wall thereof, at opposite points, the two tubes 17 which merge into the single tube 18. The ends of these tubes 17 open through the wall of the cap 11 and are adapted to coincide with apertures 19 formed through the portions 2 of the shell. Each of these apertures opens into one of the areas between a portion 6 of the expansible body 5 and the adjacent shell portion so that when the tube 18 is connected with the usual machine for injecting air into and withdrawing it from these areas, the expansible tube or liner of the cup will be enlarged and contracted to create the necessary massaging action for effecting the withdrawal of the milk.

While the tubular body 5 may be made entirely of rubber, and it is preferred that a pure white rubber be employed for this tube, it is preferred also that a cloth reinforcement be embedded between the wall faces of the sections of the tubular body so as to limit the expansion of the same and thus prevent the possibility of its being ruptured.

From the foregoing description it will be readily seen that the teat cup embodying the present invention is of such a character that it may easily be kept clean and sanitary, and also it may be readily and quickly disassembled for cleaning and reassembled for use.

Having thus described the invention, what is claimed is:

1. A teat cup, comprising a cylindrical body divided longitudinally to form two sections, resilient liners each covering the inner face of one of said sections, means for securing together the longitudinal edges of said liners and cup sections, means for carrying off milk from one end of the body, and means for injecting air into and extracting it from the area between each of said liners and the adjacent section.

2. A teat cup of the character described, comprising a cylindrical outer body and a cylindrical resilient inner body, said inner and outer bodies being longitudinally divided to be each separated into two portions, a retaining member frictionally engaged over one end of the outer body, a cap retainer frictionally engaged over the other end of said body and closing the same, a tube leading off from said cap retainer, and air tubes secured to said cap retainer and each opening through the same and through the adjacent outer body wall into the area between the outer body and the inner body.

3. A teat cut of the character described, comprising an elongated tubular body divided longitudinally to form two sections, each of said sections having an outwardly projecting flange along each of its longitudinal edges, a tubular liner for said body formed of a resilient material and divided longitudinally into two sections, each of said liner sections having a lateral flange along each longitudinal edge, said liner section flanges being arranged in abutting relation between the opposed flanges of the body sections, a laterally projecting bead surrounding each end of the liner and positioning against an adjacent end edge of the body, a cap frictionally engaging over each end of said body, each cap having a shoulder securing the adjacent liner bead to the body, a head piece covering one of said caps and having a tube leading therefrom, and means for injecting air into and extracting it from the areas between the liner sections and the wall of the body.

4. A teat cup of the character described, comprising an elongated tubular body divided longitudinally to form two sections, each of said sections having an outwardly projecting flange along each of its longitudinal edges, a tubular liner for said body formed of a resilient material and divided longitudinally into two sections, each of said liner sections having a lateral flange along each longitudinal edge, said liner section flanges being arranged in abutting relation between the opposed flanges of the body sections, a laterally projecting bead surrounding each end of the liner and positioning against an adjacent end edge of the body, a cap frictionally engaging over each end of said body, each cap having a shoulder securing the adjacent liner bead to the body, a head piece covering one of said caps and having a tube leading therefrom, said tubular body sections each having an aperture through the wall thereof adjacent one end, a pair of air tubes each connected with and opening at one end through the wall of the cap having the head over the end, said tubes being brought into registry with said apertures when the last mentioned cap is placed in position on the body, and an air tube connected with and common to the tubes attached to the cap.

In testimony whereof I hereunto affix my signature.

PERCY CLIFFORD ASHTON.